United States Patent
Cho

(10) Patent No.: US 8,964,000 B2
(45) Date of Patent: Feb. 24, 2015

(54) APPARATUS AND METHOD FOR PROCESSING DIGITAL SIGNAL

(71) Applicant: LG Electronics Inc., Seoul (KR)

(72) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/139,258

(22) Filed: Dec. 23, 2013

(65) Prior Publication Data

US 2014/0118510 A1    May 1, 2014

Related U.S. Application Data

(63) Continuation of application No. 13/593,242, filed on Aug. 23, 2012.

(30) Foreign Application Priority Data

May 24, 2012 (WO) ................ PCT/KR2012/004129

(51) Int. Cl.
   *H04N 15/00*    (2006.01)
   *H04N 13/02*    (2006.01)
   *H04N 13/04*    (2006.01)
   *H04N 13/00*    (2006.01)

(52) U.S. Cl.
   CPC ....... *H04N 13/0456* (2013.01); *H04N 13/0018* (2013.01); *H04N 13/0022* (2013.01)
   USPC ........................................................... 348/46

(58) Field of Classification Search
   CPC ....................... H04N 13/0018; H04N 13/0033
   USPC ........................................................... 348/46
   See application file for complete search history.

(56) References Cited

U.S. PATENT DOCUMENTS

| | | | |
|---|---|---|---|
| 2007/0236560 A1* | 10/2007 | Lipton et al. ..................... | 348/43 |
| 2009/0091667 A1* | 4/2009 | Schultz et al. ................... | 349/15 |
| 2011/0018849 A1* | 1/2011 | Lowe et al. ..................... | 345/205 |
| 2011/0175902 A1* | 7/2011 | Mahowald ..................... | 345/419 |
| 2011/0234760 A1* | 9/2011 | Yang et al. ..................... | 348/46 |
| 2012/0154558 A1* | 6/2012 | Ahn et al. ........................ | 348/54 |
| 2012/0257816 A1* | 10/2012 | Witt .............................. | 382/154 |
| 2013/0163855 A1* | 6/2013 | Mathur .......................... | 382/154 |

FOREIGN PATENT DOCUMENTS

| | | |
|---|---|---|
| JP | 2010-273333 A | 12/2010 |
| JP | 2012-089906 A | 5/2012 |
| KR | 10-2011-0097879 A1 | 8/2011 |
| WO | 2006/049208 A1 | 5/2006 |
| WO | 2010/058368 A1 | 5/2010 |

* cited by examiner

*Primary Examiner* — Jeremaiah C Hallenbeck-Huber

(74) *Attorney, Agent, or Firm* — Birch, Stewart, Kolasch & Birch, LLP

(57) ABSTRACT

A digital signal processing apparatus including a receiver configured to receive a digital signal including a first image source and a second image source, an image processor configured to generate a main image from the first image source and an additional image from the second image source, wherein the additional image is an expanded image of the main image, and the expanded image is partially corresponding to the main image, a first display unit configured to display the main image, and a second display unit configured to display the additional image which is seamlessly connected to an edge region of the main image.

19 Claims, 11 Drawing Sheets

APPARATUS AND METHOD FOR PROCESSING DIGITAL SIGNAL

This application is a continuation of Ser. No. 13/593,242, filed on Aug. 23, 2012, which claims the benefit of PCT Application No. PCT/KR2012/004129, filed on May 24, 2012, which is hereby incorporated by reference as if fully set forth herein.

BACKGROUND OF THE INVENTION

1. Field of the Invention

The present invention relates to an apparatus and method for processing a digital signal including a 3-Dimensional (3D) image.

2. Discussion of the Related Art

As propagation of 3-Dimensional Televisions (3DTVs) has begun, propagation of 3D content via storage media as well as transmission of 3D content via Digital Broadcasting are being actively progressed. In general, 3D images provide stereoscopic viewing based on the principle of stereo-vision of the viewer's eyes. A human being attains a feeling of space via binocular disparity based on binocular parallax between the two eyes, in other words, based on a distance between the two eyes spaced apart from each other by about 65 mm. Therefore, 3D images may provide stereoscopic viewing and a feeling of space by allowing the left eye and the right eye to view associated planar images respectively.

Display methods for 3D images include a stereoscopic method, a volumetric method, and a holographic method, for example. In the case of the stereoscopic method, a left view image to be viewed by the left eye and a right view image to be viewed by the right eye are given, such that the viewer can perceive 3D image effects as the left eye and the right eye respectively view the left view image and the right view image through polarized glasses or display equipment itself.

A conventional 3DTV can display a 3D image within a limited size of screen. That is, the conventional 3DTV can only provide a 3D image within a screen range defined by the 3DTV based on a feeling of space. As such, there is required a method for displaying a part of a 3D image as if it escapes from a screen region of a 3DTV.

SUMMARY OF THE INVENTION

Accordingly, the present invention is directed to an apparatus and method for processing a digital signal that substantially obviate one or more problems due to limitations and disadvantages of the related art.

An object of the present invention is to provide an apparatus and method for processing a digital signal containing a 3D image. In particular, in the digital signal processing apparatus according to the present invention, it is necessary to edit a received 3D image prior to showing the 3D image to a viewer, in order to enhance stereoscopic viewing effects of the 3D image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital signal processing apparatus includes a receiver for receiving a first digital signal including a main image and a second digital signal including an additional image, wherein the main image and the additional image are 3D images, and the additional image is an expanded image of the main image and is seamlessly connected to an edge region of the main image, an image processor for generating the main image and the additional image to output a 3D image by decoding the first digital signal and the second digital signal, and a display unit for displaying the output 3D image, wherein the display unit includes a first display unit for displaying the main image of the 3D image, and a second display unit in the form of a transparent display unit connected to an edge of the first display unit, the second display unit serving to display the additional image of the 3D image.

The additional image included in the second digital signal may include only pixels having negative binocular disparity, and the negative binocular disparity may provide a forward depth of the display unit.

The image processor may further perform an operation of determining signs of binocular disparity by comparing pixels of a left view image and a right view image of the generated additional image with each other.

The image processor may selectively output only pixels having negative binocular disparity of the generated additional image, and the negative binocular disparity may provide a forward depth of the display unit.

The image processor may further perform an operation of synchronizing the main image and the additional image.

In accordance with another aspect of the present invention, a digital signal processing apparatus includes a receiver for receiving a digital signal including a 3D image, and an image processor for generating the 3D image by decoding the digital signal, setting an edge region of the 3D image, and selectively outputting only pixels having negative binocular disparity with respect to the set edge region, wherein the negative binocular disparity provides a forward depth of a display unit.

The digital signal may include a left view image and a right view image for generation of the 3D image, and the image processor may further perform an operation of determining signs of binocular disparity of pixels by comparing the pixels of the left view image and the right view image with each other.

The digital signal may include image data and depth information, and the image processor may further perform an operation of determining signs of binocular disparity of the respective pixels based on the depth information.

The 3D image may include a plurality of layers having different depths, the image processor may further perform an operation of cropping the set edge region with respect to some layers of the plurality of layers having positive binocular disparity, and the positive disparity may provide a rearward depth of the display unit.

The set edge region may be set in consideration of at least one of positions, movement directions, and movement speeds of images constituted by the pixels having negative binocular disparity within the generated 3D image.

In accordance with another aspect of the present invention, a digital signal processing method includes receiving a first digital signal including a main image and a second digital signal including an additional image, wherein the main image and the additional image are 3D images, and the additional image is an expanded image of the main image and is seamlessly connected to an edge region of the main image, generating the main image and the additional image to output a 3D image by decoding the first digital signal and the second digital signal, and displaying the output 3D image consisting of the main image and the additional image seamlessly connected to each other.

The additional image included in the second digital signal may include only pixels having negative binocular disparity, and the negative binocular disparity may provide a forward depth of a display unit.

The outputting the 3D image may further include determining signs of binocular disparity by comparing pixels of a left view image and a right view image of the generated additional image with each other.

The outputting the 3D image may further include selectively outputting only pixels having negative binocular disparity of the generated additional image, and the negative binocular disparity may provide a forward depth of a display unit.

The outputting the 3D image may further include synchronizing the main image and the additional image.

In accordance with a further aspect of the present invention, a digital signal processing method includes receiving a digital signal including a 3D image, and generating the 3D image by decoding the digital signal, setting an edge region of the 3D image, and selectively outputting only pixels having negative binocular disparity with respect to the set edge region, wherein the negative binocular disparity provides a forward depth of a display unit.

The digital signal may include a left view image and a right view image for generation of the 3D image, and the selective output may further include determining signs of binocular disparity of the pixels by comparing the pixels of the left view image and the right view image with each other.

The digital signal may include image data and depth information, and the selective output may further include determining signs of binocular disparity of the respective pixels based on the depth information.

The 3D image may include a plurality of layers having different depths, the selectively output may further include cropping the set edge region with respect to some layers of the plurality of layers having positive binocular disparity, and the positive disparity may provide a rearward depth of the display unit.

The set edge region may be set in consideration of at least one of positions, movement directions, and movement speeds of images constituted by the pixels having negative binocular disparity within the generated 3D image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

Although the terms used in the following description are selected, as much as possible, from general terms that are widely used at present while taking into consideration of the functions obtained in accordance with the present invention, these terms may be replaced by other terms based on intensions of those skilled in the art, customs, emergence of new technologies, or the like. Also, in a particular case, terms that are arbitrarily selected by the applicant of the present invention may be used. In this case, the meanings of these terms may be described in corresponding description parts of the invention. Accordingly, it should be noted that the terms used herein should be construed based on practical meanings thereof and the whole content of this specification, rather than being simply construed based on names of the terms.

Figure 1A:
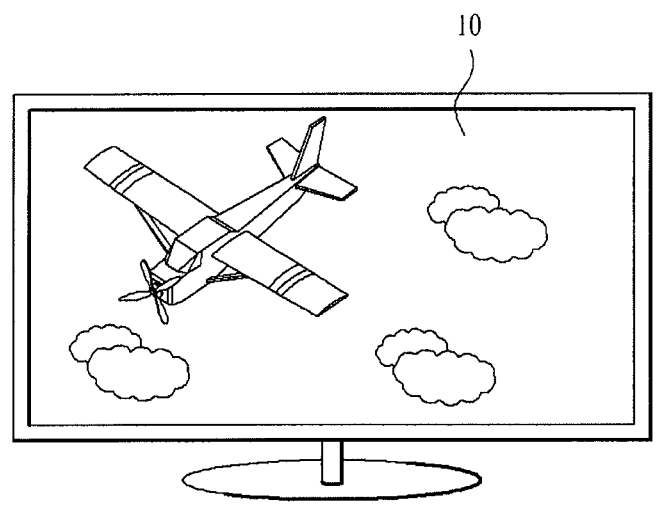
FIGS. 1A and 1B are views showing a method for displaying a 3D image according to an embodiment of the present invention.
Figure 1B:
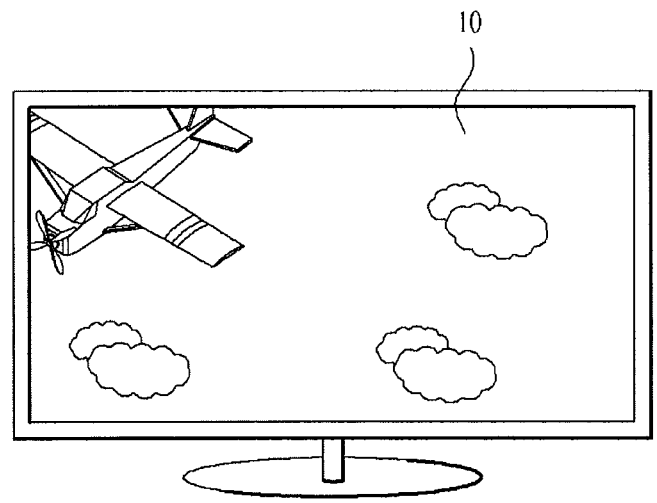

FIGS. 1A and 1B are views showing a method for displaying a 3D image according to an embodiment of the present invention. According to the present invention, an apparatus for processing a digital signal may display a 3D image. More particularly, the digital signal processing apparatus may display a 3D image based on positive binocular disparity or negative binocular disparity. The negative binocular disparity may allow a viewer to perceive a forward depth on the basis of a display unit 10 included in the digital signal processing apparatus. The positive binocular disparity may allow the viewer to perceive a rearward depth on the basis of the display unit 10. As such, through provision of binocular disparity, the digital signal processing apparatus can provide the viewer with images having various depths forward and rearward of the display unit 10.

However, it is noted that the aforementioned depths are given within a limited region of the display unit 10 of the digital signal processing apparatus. Thus, in the case in which an object within a 3D image moves and is displayed on an edge region of the display unit 10, displaying the corresponding object within a limited region may cause deterioration in stereoscopic viewing.

In one example, if an airplane image displayed on a central region of the display unit 10 as shown in FIG. 1A moves within a range of content and is displayed on an edge region of the display unit 10 as shown in FIG. 1B, the viewer may no longer view a part of the corresponding object. Thus, as described above, the viewer may experience deterioration in stereoscopic viewing. In FIG. 1B, a part of a propeller, a part of a right front wing, and a part of a tail wing in the airplane image escape from a screen region and are no longer displayed. As a result, in this case, the viewer may consider that the airplane image is confined in the display unit 10, which may cause deterioration in stereoscopic viewing. To solve this problem, there is a need for a method of enhancing stereoscopic viewing.

Figure 2:
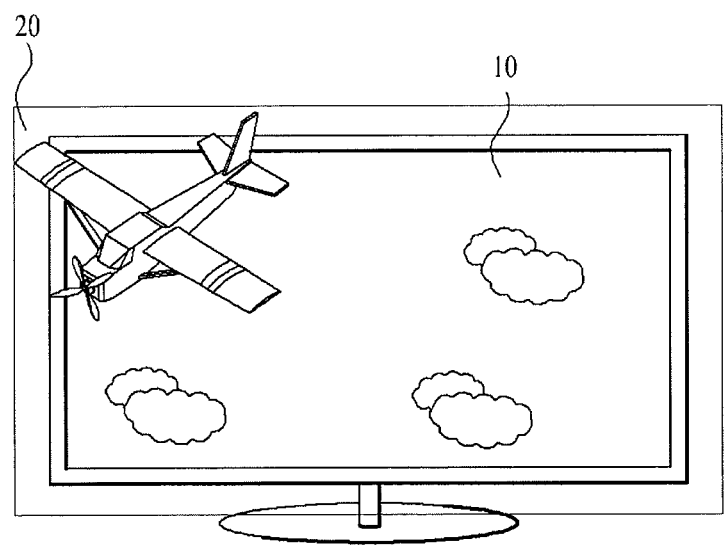
FIG. 2 is a view showing a method for displaying a 3D image according to another embodiment of the present invention.

FIG. 2 is a view showing a method for displaying a 3D image according to another embodiment of the present invention. To overcome disadvantageous deterioration in stereoscopic viewing as described above with reference to FIG. 1B, an apparatus for displaying a digital signal according to the present invention may include an additional display unit 20. The additional display unit 20, as shown in FIG. 2, may be seamlessly connected to a rim portion of the above described existing display unit 10. In the following description, the existing display unit 10 is referred to as a first display unit, and the additional display unit 20 is referred to as a second display unit.

The first display unit 10, as described above with reference to FIG. 1B, may function to display only a part of an object within a 3D image when the corresponding object is located in the edge region of the first display unit 10. In FIG. 2, likewise, the airplane image, which is one of images displayed on the first display unit 10, is displayed such that a part of the propeller, a part of the right front wing, and a part of the tail wing are cut off as shown in FIG. 1B.

To compensate for solve the partial cut-off of the image, an image to be displayed on the second display unit 20 may be an expanded image of the image displayed on the first display unit 10, and may be an image seamlessly connected to the image displayed on the first display unit 10. In one example, in FIG. 2, the second display unit 20 may additionally display a part of the propeller, a part of the right front wing, and a part of the tail wing that cannot be displayed on the first display unit 10.

The second display unit 20 may be adapted to display only pixels having negative binocular disparity. More particularly, in the digital signal processing apparatus, the second display unit 20 may display only pixels having a forward depth on the basis of the display unit. As such, it is possible to allow the viewer to perceive a displayed image as if a part of the image escapes from a limited region of the display unit 10, which may provide the viewer with improved stereoscopic viewing. In one example, among the 3D images in FIG. 2, if the airplane image has negative binocular disparity and a sky image as background has positive binocular disparity, the second display unit 20 may function to display only pixels included in the airplane image having negative binocular disparity. The background having positive binocular disparity may be excluded from display objects.

The digital signal processing apparatus of the present invention may include the second display unit 20 of a transparent display type. The transparent second display unit, as described above, is adapted to display only pixels having negative binocular disparity, and thus may keep the other region transparent. As such, the digital signal processing apparatus may maximize the effect that the image consisting of the pixels displayed on the transparent second display unit 20 escapes from the limited region of the first display unit 10. In FIG. 2, the viewer can view a part of the propeller, a part of the right front wing, and a part of the tail wing in the airplane image, along with other peripheral objects that are seen through the transparent second display unit 20. As such, the digital signal processing apparatus can provide the effect of allowing the viewer to perceive the airplane image as if an airplane comes out of a virtual space provided by the first display unit 10 into an actual space in which other peripheral objects exist.

Figure 3A:
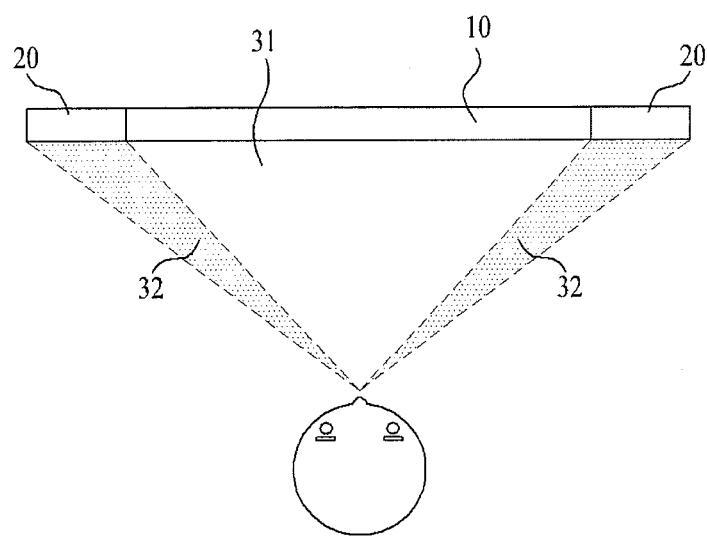
FIGS. 3A and 3B are views showing an expanded screen region according to an embodiment of the present invention.
Figure 3B:
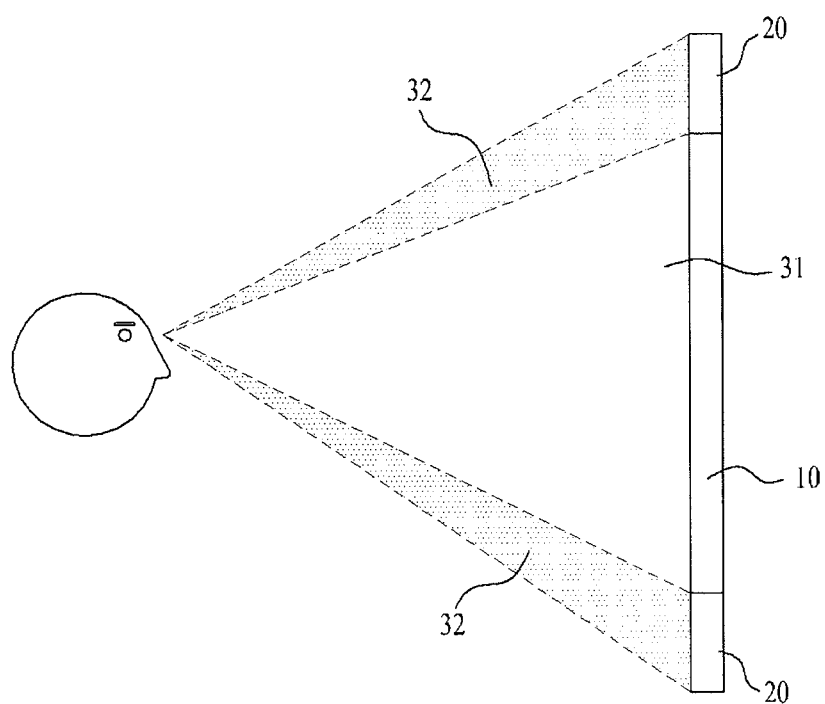

FIGS. 3A and 3B are views showing an expanded screen region according to an embodiment of the present invention. FIG. 3A is a plan view showing the viewer and the digital signal processing apparatus. The digital signal processing apparatus may include the first display unit 10 and the second display unit 20 seamlessly connected to either left or right side of the first display unit 10. In the digital signal processing apparatus, a space 31, through which a 3D image can be provided to the viewer by means of the first display unit 10, may be defined forward or rearward on the basis of the first display unit 10. A forward depth is provided by negative binocular disparity, and a rearward depth is provided by positive binocular disparity. However, as described above with reference to FIG. 1, the digital signal processing apparatus has difficulty in providing the effect of allowing the viewer to perceive a 3D image as if the 3D image comes into an actual space out of the first display unit 10.

The digital signal processing apparatus can provide an additional space 32, through which a 3D image can be provided to the viewer by means of the second display unit 20, at either left or right side of the first display unit 10. According to an embodiment, the second display unit 20 may display only pixels having negative binocular disparity, and thus may display images having a forward depth on the basis of the second display unit 20. As such, as described above, the digital signal processing apparatus may enhance, by means of the transparent second display unit 20, the effect of allowing the viewer to perceive an image consisting of pixels having negative binocular disparity as if the image escapes from a limited region of the first display unit 10. In one example, if an image having a forward depth on the basis of the display unit moves from the first display unit 10 to the second display unit 20 to thereby be displayed on the second display unit 20, the digital signal processing apparatus may allow the viewer to perceive the corresponding image as if the image exists in an actual space where the user is located, other than a virtual space provided by the first display unit 10.

FIG. 3B is a side sectional view showing the viewer and the digital signal processing apparatus. The digital signal processing apparatus may include the first display unit 10 and the second display unit 20 seamlessly connected to either upper or lower side of the first display unit 10. In the digital signal processing apparatus, the space 31, through which a 3D image can be provided to the viewer by means of the first display unit 10, may be defined forward or rearward on the basis of the first display unit 10. Also, the digital signal processing apparatus can provide the additional space 32, through which a 3D image can be provided to the viewer by means of the second display unit 20, at either upper or lower side of the first display unit 10. According to an embodiment, the second display unit 20 may display only pixels having negative binocular disparity, and thus may display images having a forward depth on the basis of the second display unit 20. As such, as described above, the digital signal processing apparatus may enhance the effect of allowing the viewer to perceive an image consisting of pixels having negative binocular disparity as if the image escapes from a limited region of the first display unit 10. That is, the digital signal processing apparatus may allow the viewer to perceive the corresponding image as if the image exists in an actual space where the user is located, other than a virtual space provided by the first display unit 10.

Figure 4A:
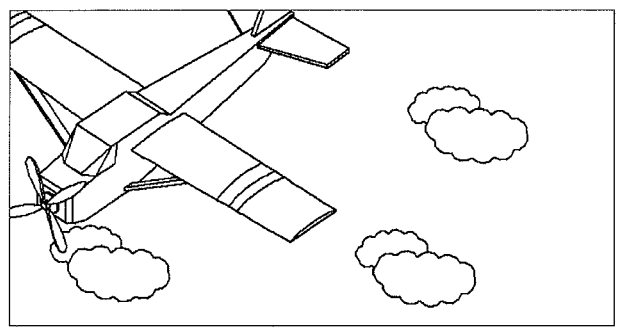
FIGS. 4A and 4B are views showing a main image and an additional image according to an embodiment of the present invention.
Figure 4B:
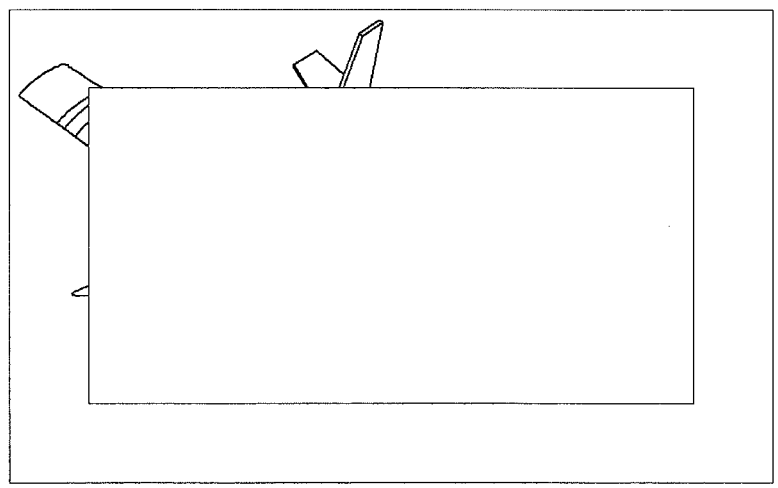

FIGS. 4A and 4B are views showing a main image and an additional image according to an embodiment of the present invention.

FIG. 4A shows a main image displayed on the first display unit of the digital signal processing apparatus, and the image may include pixels having positive binocular disparity and pixels having negative binocular disparity. As such, the main image may represent both a forward depth and a rearward depth on the basis of the display unit of the digital signal processing apparatus. In one example, in FIG. 4A, the airplane image may be represented by a forward depth of the display unit, such that the viewer perceives the airplane image as if the image protrudes toward the viewer. In another example, the sky image as background may be represented by a rearward depth of the display unit, such that the viewer perceives the sky image as if the image is drawn away from the viewer.

FIG. 4B shows an additional image displayed on the second display unit. The additional image is an expanded image seamlessly connected to an edge of the main image. According to an embodiment, the additional image may include only pixels having negative binocular disparity, or may include pixels having positive binocular disparity and pixels having negative binocular disparity.

FIG. 4B shows an example of the additional image consisting of only pixels having negative binocular disparity. The additional image is an image seamlessly connected to the main image, and therefore each pixel of the additional image has the same depth as a corresponding pixel of the main image seamlessly connected thereto. In one example, in FIG. 4B, one pixel representing the propeller of the airplane displayed in the additional image may have the same depth as a corresponding pixel which is located adjacent and seamlessly connected to the pixel and represents the propeller of the airplane displayed in the main image. This may be equally applied even to pixels representing a part of the right wing and a part of the tail wing of the airplane displayed in FIG. 4B. In FIG. 4B, the sky image as background may consist of pixels having positive binocular disparity, and thus may not be displayed.

The main image and the additional image may be included in the same digital signal, and thus be received together. Alternatively, the main image and the additional image may be included in different digital signals, and thus may be received individually. In FIG. 5, as will be described hereinafter, the main image and the additional image may be included in different digital signals and be received individually.

Figure 5A:
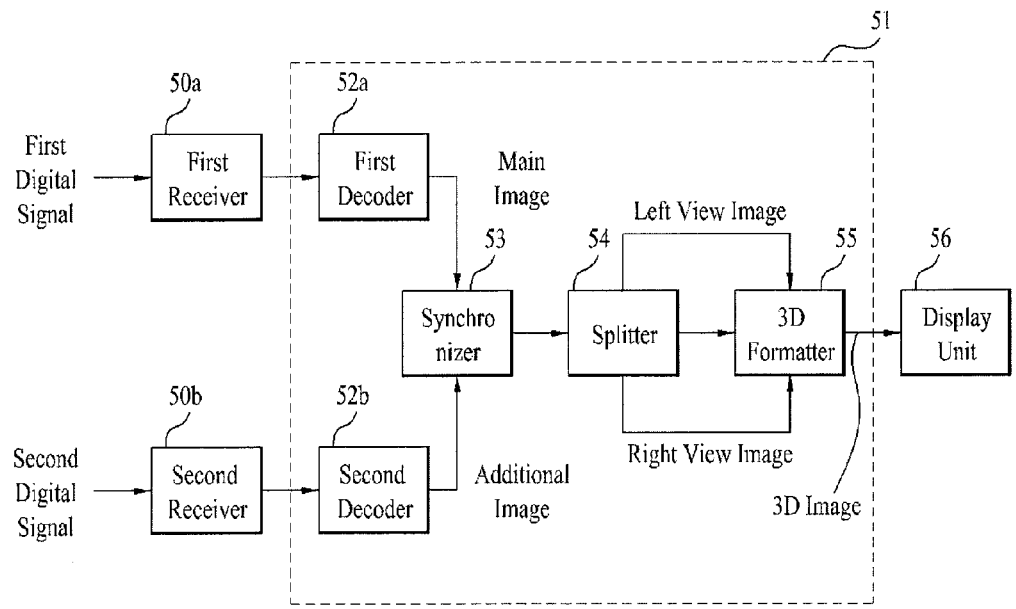
FIGS. 5A and 5B are block diagrams of an apparatus for processing a digital signal according to an embodiment of the present invention.
Figure 5B:
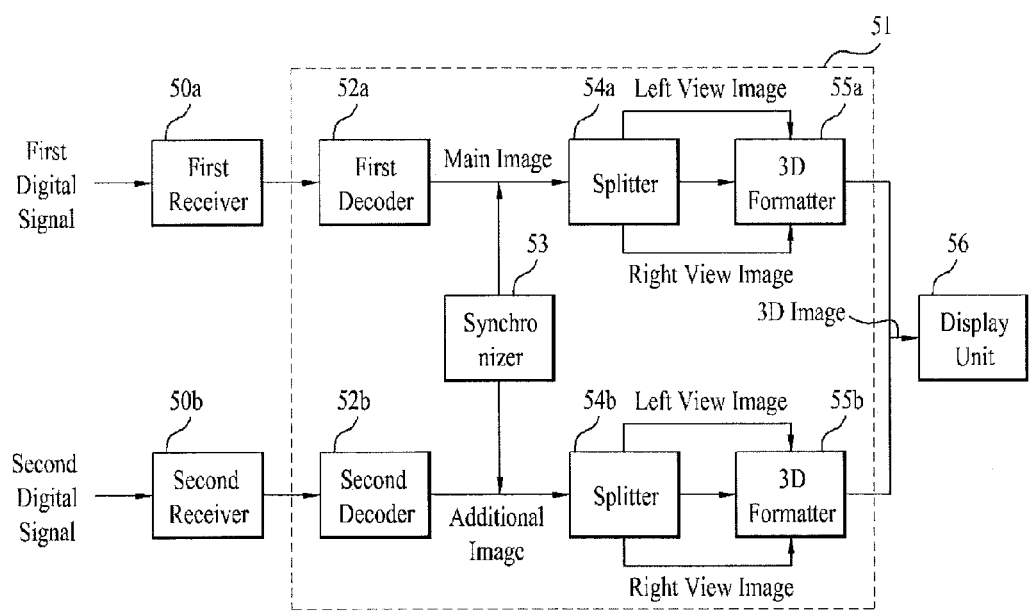

FIGS. 5A and 5B are block diagrams of a digital signal processing apparatus according to an embodiment of the present invention. In FIG. 5A, a first digital signal including a main image and a second digital signal including an additional image may be received respectively by a first receiver 50a and a second receiver 50b. The first receiver 50a and the second receiver 50b may include a tuner of a television, a cable broadcasting receiver, or a network adaptor of a multimedia appliance. The first receiver 50a and the second receiver 50b may receive the digital signals through different paths. In one example, if the first digital signal is a public television signal and the second digital signal is a data signal transmitted through a network, the first receiver 50a may be a tuner and the second receiver 50b may be a network adaptor. Likewise, the first receiver 50a and the second receiver 50b may include a combination of a tuner and a cable broadcasting receiver, or a combination of a cable broadcasting receiver and a network adaptor.

The first digital signal and the second digital signal received respectively by the first receiver 50a and the second receiver 50b are input to an image processor 51. The image processor 51 may include at least one of first and second decoders 52a and 52b, a synchronizer 53, a splitter 54, and a 3D formatter 55.

The first and second digital signals input to the image processor 51 are decoded by the first decoder 52a and the second decoder 52b. The first digital signal is decoded to output a main image, and the second digital signal is decoded to output an additional image. If the additional image includes both pixels having positive binocular disparity and pixels having negative binocular disparity, the second decoder 52b may selectively output only the pixels having negative binocular disparity. If the additional image includes only pixels having negative binocular disparity, the second decoder 52b may directly output the decoded result.

The main image and the additional image, respectively output by the first decoder 52a and the second decoder 52b, may be synchronized by the synchronizer 53. Since the additional image is an expanded image seamlessly connected to the main image, accurate synchronization of the main image and the additional image is necessary. The first digital signal and the second digital signal are received respectively by the first receiver 50a and the second receiver 50b, and thus may be received at different times. Accordingly, the synchronizer 53 may synchronize the main image and the additional image to seamlessly connect the two images to each other.

The synchronized main and additional images are input to the splitter 54 so as to be divided into a left view image and a right view image for a 3D image. The left view image and the right view image may be input to the 3D formatter 55 to enable output of a 3D image.

The output 3D image may be input to a display unit for display of the 3D image. The display unit 56 may include a first display unit to display a 3D main image and a second display unit to display a 3D additional image. The second display unit, as described above with reference to FIG. 2, may be connected to an edge of the first display unit, such that the 3D main image and the 3D additional image are displayed like a single 3D image to be viewed by the viewer.

The first display unit may display pixels having positive binocular disparity and pixels having negative binocular disparity, and the second display unit may display only pixels having negative binocular disparity. As such, the pixels having a rearward depth on the basis of the display unit may be displayed only on the first display unit, and the pixels having a forward depth on the basis of the display unit may be displayed on the first and second display units. That is, the digital signal processing apparatus may provide the effect of allowing the viewer to perceive the image formed of the pixels having a forward depth as if the image comes out of a limited region of the first display unit into an actual space.

FIG. 5B is a block diagram showing a digital signal processing apparatus having an image processor that includes a plurality of splitters and a plurality of 3D formatters. In FIG. 5B, a first digital signal including a main image and a second digital signal including an additional image may be received respectively by the first receiver 50a and the second receiver 50b. The first receiver 50a and the second receiver 50b may include a tuner of a television, a cable broadcasting receiver, or a network adaptor of a multimedia appliance. The first receiver 50a and the second receiver 50b may receive the digital signals through different paths. In one example, if the first digital signal is a public television signal and the second digital signal is a data signal transmitted through a network, the first receiver 50a may be a tuner and the second receiver 50b may be a network adaptor. Likewise, the first receiver 50a and the second receiver 50b may include a combination of a tuner and a cable broadcasting receiver, or a combination of a cable broadcasting receiver and a network adaptor.

The first digital signal and the second digital signal received respectively by the first receiver 50a and the second receiver 50b are input to the image processor 51. The image processor 51 may include at least one of the first and second decoders 52a and 52b, the synchronizer 53, the first and second splitters 54a and 54b, and the first and second 3D formatters 55a and 55b.

The first and second digital signals input to the image processor 51 are decoded by the first decoder 52a and the second decoder 52b. The first digital signal is decoded to output a main image, and the second digital signal is decoded to output an additional image. If the additional image includes both pixels having positive binocular disparity and pixels having negative binocular disparity, the second decoder 52b may selectively output only the pixels having negative binocular disparity. If the additional image includes only pixels having negative binocular disparity, the second decoder 52b may directly output the decoded result.

The main image and the additional image, respectively output by the first decoder 52a and the second decoder 52b, may be synchronized by the synchronizer 53. Since the additional image is an expanded image seamlessly connected to the main image, accurate synchronization of the main image and the additional image is necessary. The first digital signal and the second digital signal are received respectively by the first receiver 50a and the second receiver 50b, and thus may be received at different times. Accordingly, the synchronizer 53 may synchronize the main image and the additional image to seamlessly connect the two images to each other.

The synchronized main and additional images are input to the first splitter 54a and the second splitter 54b so as to be divided into a left view image and a right view image for a 3D image. The left view image and the right view image of the main image may be input to the first 3D formatter 55a to enable output of a 3D main image. The left view image and the right view image of the additional image may be input to the second 3D formatter 55b to enable output of a 3D additional image.

The output 3D images may be input to the display unit 56 for display of the 3D images. The display unit 56 may include a first display unit to display a 3D main image and a second display unit to display a 3D additional image. The second display unit may include a transparent display, and as described above with reference to FIG. 2, may be connected to an edge of the first display unit, such that the 3D main image and the 3D additional image are displayed like a single 3D image to be viewed by the viewer.

The first display unit may display pixels having positive binocular disparity and pixels having negative binocular disparity of the 3D main image, and the second display unit may display only pixels having negative binocular disparity of the 3D additional image. As such, the pixels having a rearward depth on the basis of the display unit may be displayed only on the first display unit, and the pixels having a forward depth on the basis of the display unit may be displayed on the first and second display units. That is, the digital signal processing apparatus may provide the effect of allowing the viewer to perceive the image formed of the pixels having a forward depth as if the image comes out of a limited region of the first display unit into an actual space.

Figure 6A:
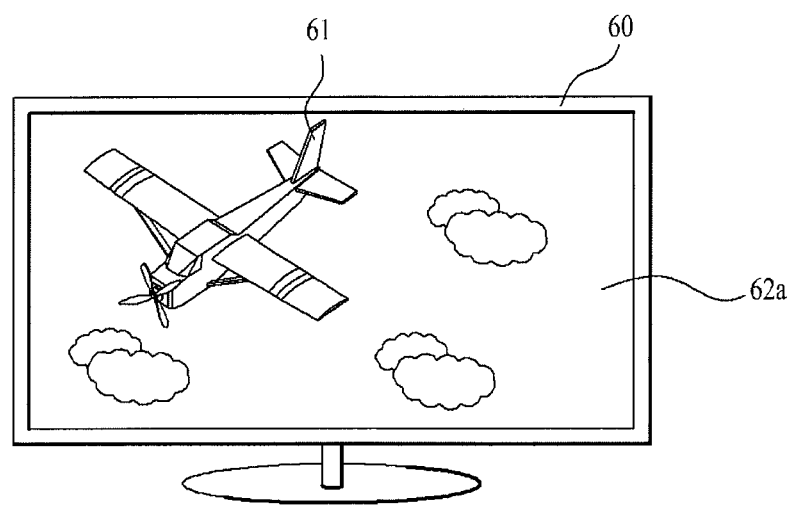
FIGS. 6A and 6B are views showing a method for displaying a 3D image on a transparent display unit according to another embodiment of the present invention.
Figure 6B:
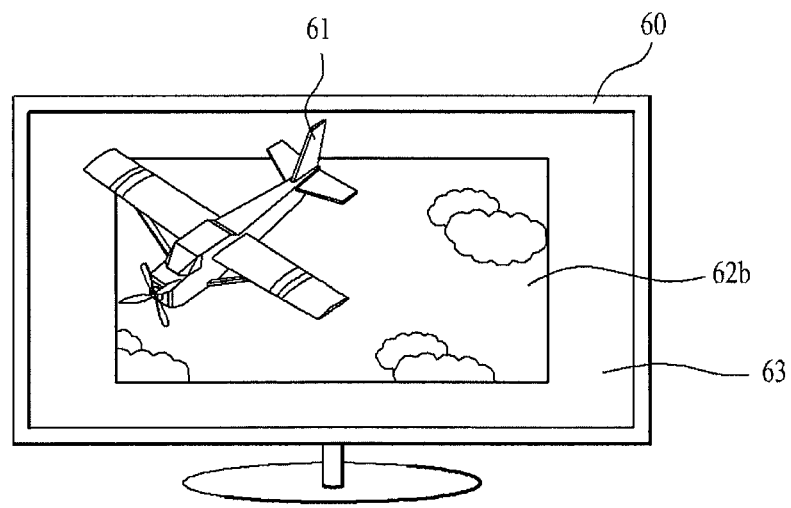

FIGS. 6A and 6B are views showing a method for displaying a 3D image on a transparent display unit according to another embodiment of the present invention.

In FIG. 6A, assuming that an airplane image 61 has negative binocular disparity and a sky image 62a as background has positive binocular disparity, the airplane image 61 provides a forward depth of the display unit and the sky image 62a provides a rearward depth of the display unit. As such, the digital signal processing apparatus 60 may provide the effect of allowing the viewer to perceive the airplane image 61 and the sky image 62a as if the airplane image 61 protrudes from the display unit and the sky image 62a is drawn into the display unit.

To enhance 3D effects as described above, the digital signal processing apparatus 60 including the transparent display unit may set an edge region of an image to be displayed, and selectively display only pixels having negative binocular disparity with respect to the set edge region.

The digital signal processing apparatus 60 may set a partial rim region of a displayed image to an edge region 63, and may display only pixels having negative binocular disparity in the corresponding edge region 63. In FIG. 6B, the edge region 63 may display only a part of the propeller, a part of the right front wing, and a part of the tail wing as some parts of the airplane image 61. This can be accomplished because the airplane image 61 consists of pixels having negative binocular disparity. On the contrary, pixels forming the sky image may not be displayed on the edge region 63. As described above, this is because the pixels forming the sky image have positive binocular disparity, and thus the sky image 62a displayed in FIG. 6A may be displayed as a sky image 62b, an edge region of which is cropped.

The above described edge region may be set in consideration of at least one of positions, movement directions, and movement speeds of images represented by the pixels having negative binocular disparity within a 3D image. In other words, in FIG. 6B, the size of the edge region, and a ratio of the edge region to the entire screen may be set in consideration of positions, movement directions, and movement speeds of the airplane image 61 formed by the pixels having negative binocular disparity. In addition, the edge region may be set on at least one of upper and lower and left and right edges of the display unit.

The edge region 63 may be set on the edge of the display unit close to the position of the image formed of the pixels having negative binocular disparity, and may be set on the edge of the display unit toward the movement direction of the corresponding image. Also, as the movement speed of the corresponding image increases, the size of the edge region may increase. That is, in FIG. 6B, in the case in which the airplane image 61 is located at the left upper edge of the display unit, the edge region 63 may be set on the left upper edge of the display unit. If the airplane image 61 moves toward the left lower edge of the display unit, the edge region 63 may be set on the left and lower edge of the display unit. Also, if the movement speed of the airplane image 61 increases, the size of the edge region 63 may increase.

In the digital signal processing apparatus 60, as described above, peripheral objects may be viewed through the transparent display unit as the edge region 63 displays only the image having negative binocular disparity, rather than displaying the background image having positive binocular disparity. Thereby, the digital signal processing apparatus 60 may allow the viewer to perceive an improved 3D image as if the 3D image comes out into an actual space other than the space where the image having negative binocular disparity is displayed.

Figure 7A:
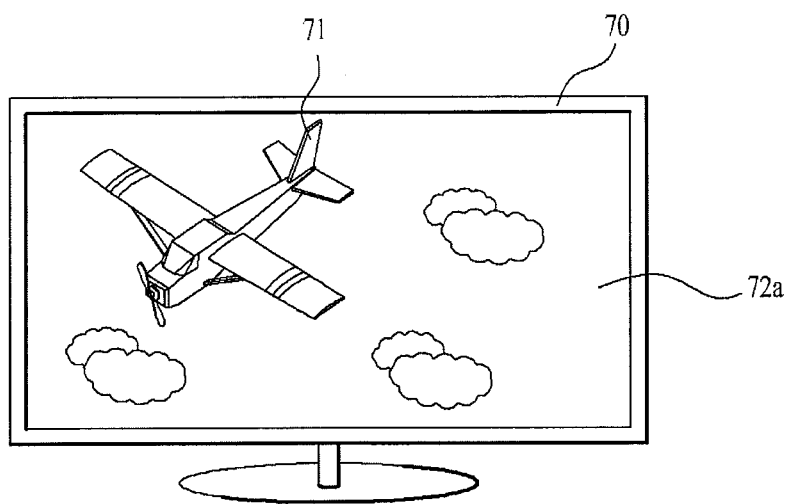
FIGS. 7A and 7B are views showing a method for displaying a 3D image on a typical display unit according to another embodiment of the present invention.
Figure 7B:
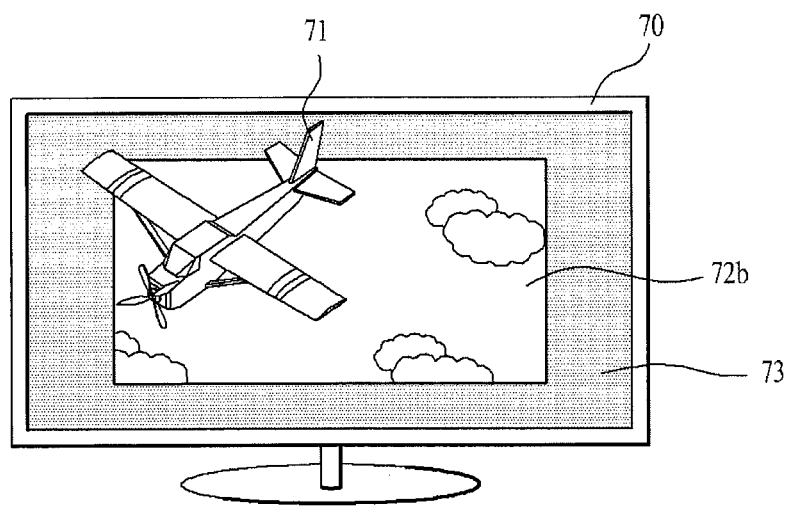

FIGS. 7A and 7B are views showing a method for displaying a 3D image on a typical display unit according to another embodiment of the present invention. In FIG. 7, assuming that an airplane image 71 has negative binocular disparity and a sky image 72a as background has positive binocular disparity, the airplane image 71 provides a forward depth of the display unit and the sky image 72a provides a rearward depth of the display unit. As such, the digital signal processing apparatus 70 may provide the effect of allowing the viewer to perceive the airplane image 71 and the sky image 72a as if the airplane image 71 protrudes from the display unit and the sky image 72a is drawn into the display unit.

To enhance 3D effects as described above, the digital signal processing apparatus 70 including the typical display unit may set an edge region of an image to be displayed, and selectively display only pixels having negative binocular disparity with respect to the set edge region.

The digital signal processing apparatus 70 may set a partial rim region of a displayed image to an edge region 73, and may display only pixels having negative binocular disparity in the corresponding edge region 73. In FIG. 7B, the edge region 73 may display only a part of the propeller, a part of the right front wing, and a part of the tail wing as some parts of the airplane image 71. This can be accomplished because the airplane image 71 consists of pixels having negative binocular disparity. On the contrary, pixels forming the sky image may not be displayed on the edge region 73. As described above, this is because the pixels forming the sky image have positive binocular disparity, and thus the sky image 72a displayed in FIG. 7A may be displayed as a sky image 72b, an edge region of which is cropped.

The above described edge region may be set in consideration of at least one of positions, movement directions, and movement speeds of images represented by the pixels having negative binocular disparity within a 3D image. In other words, in FIG. 7B, the size of the edge region, and a ratio of the edge region to the entire screen may be set in consideration of positions, movement directions, and movement speeds of the airplane image 71 formed by the pixels having negative binocular disparity. In addition, the edge region may be set on at least one of upper and lower and left and right edges of the display unit.

The edge region 73 may be set on the edge of the display unit close to the position of the image formed of the pixels having negative binocular disparity, and may be set on the edge of the display unit toward the movement direction of the corresponding image. Also, as the movement speed of the corresponding image increases, the size of the edge region may increase. That is, in FIG. 7B, in the case in which the airplane image 71 is located at the left upper edge of the display unit, the edge region 73 may be set on the left upper edge of the display unit. If the airplane image 71 moves toward the left lower edge of the display unit, the edge region 73 may be set on the left and lower edge of the display unit. Also, if the movement speed of the airplane image 71 increases, the size of the edge region 73 may increase.

In the digital signal processing apparatus 70, as described above, the edge region 73 displays only the image having negative binocular disparity, rather than displaying the background image 72a having positive binocular disparity. Thereby, the digital signal processing apparatus may provide the viewer with improved 3D effects by allowing the viewer to perceive the images 71 and 72a as if the image 71 having negative binocular disparity comes out of the background image 72b having positive binocular disparity.

Figure 8:
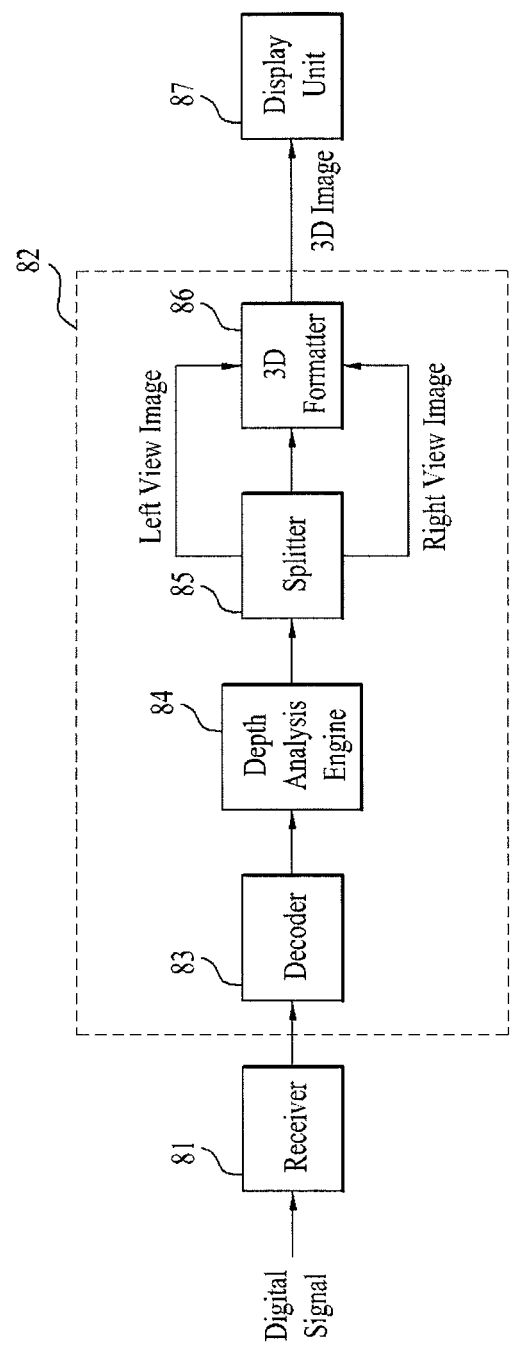
FIG. 8 is a block diagram of an apparatus for processing a digital signal according to another embodiment of the present invention.

FIG. 8 is a block diagram of an apparatus for processing a digital signal according to another embodiment of the present invention. In FIG. 8, a digital signal may be received by a receiver 81. Here, the digital signal may include a left view image and a right view image for a 3D image, or may include image data and depth information. The receiver 81 may include a tuner of a television, a cable broadcasting receiver, or a network adaptor of a multimedia appliance.

The digital signal received by the receiver 81 is input to the image processor 82. The image processor 82 may include at least one of a decoder 83, a depth analysis engine 84, a splitter 85, and a 3D formatter 86.

The digital signal input to the image processor 82 is decoded by the decoder 83 of the image processor 82. The decoder 83 may decode the digital signal to output a left view image and a right view image included in the digital signal. If the digital signal includes image data and depth information, the decoder may generate and output the left view image and the right view image using the image data and the depth information.

The depth analysis engine 84 of the image processor may determine signs of binocular disparity of the respective pixels forming an image by comparing the left view image and the right view image output from the decoder 83. Also, in the case in which the digital signal includes image data and depth information, the depth analysis engine 84 may determine signs of binocular disparity of the respective pixels using the depth information.

The depth analysis engine 84 may set an edge region of the image based on the determined signs of binocular disparity of the respective pixels. The edge region, as described above with reference to FIG. 7, may be set in consideration of at least one of positions, movement directions, and movement speeds of images represented by pixels having negative binocular disparity in the entire image.

After the edge region has been set based on the signs of binocular disparity of the respective pixels, the depth analysis engine 84 may selectively output only the pixels having negative binocular disparity with respect to edge regions of the left view image and the right view image, and may not output the pixels having positive binocular disparity. The depth analysis engine 84 may output all the pixels regardless of the signs of binocular disparity with respect to a region other than the edge region. As a result, the depth analysis engine 84 may output the left view image and the right view image, edge regions of which are corrected.

The left view image and the right view image output from the depth analysis engine 84 may be input to the splitter 85 so as to be divided into a left view image and a right view image for a 3D image. The left view image and the right view image are input to the 3D formatter 85 to enable output of a 3D image.

The output 3D image may be input to a display unit for display of the 3D image. In the digital signal processing apparatus of the present invention, the display unit 87 may be an optional element and may be omitted according to an embodiment.

The display unit may display pixels having positive binocular disparity and pixels having negative binocular disparity on a region except for the edge region, and may display only the pixels having negative binocular disparity on the edge region. As such, the edge region may display only the pixels having a forward depth of the display unit.

Accordingly, in the digital signal processing apparatus, as described above, the edge region displays only an image having negative binocular disparity, rather than displaying a background image having positive binocular disparity. Thereby, the digital signal processing apparatus may provide the viewer with improved 3D effects by allowing the viewer to perceive the images as if the image having negative binocular disparity comes out of the background image having positive binocular disparity.

Figure 9A:
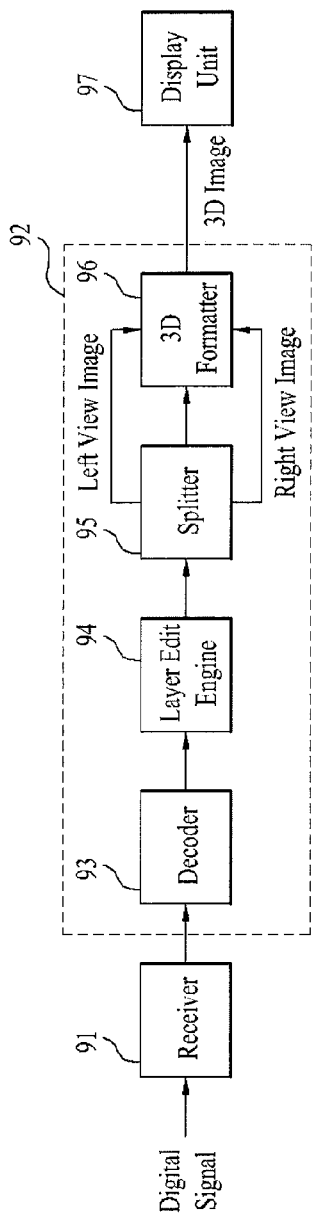
FIGS. 9A and 9B are block diagrams of an apparatus for processing a digital signal according to another embodiment of the present invention.
Figure 9B:
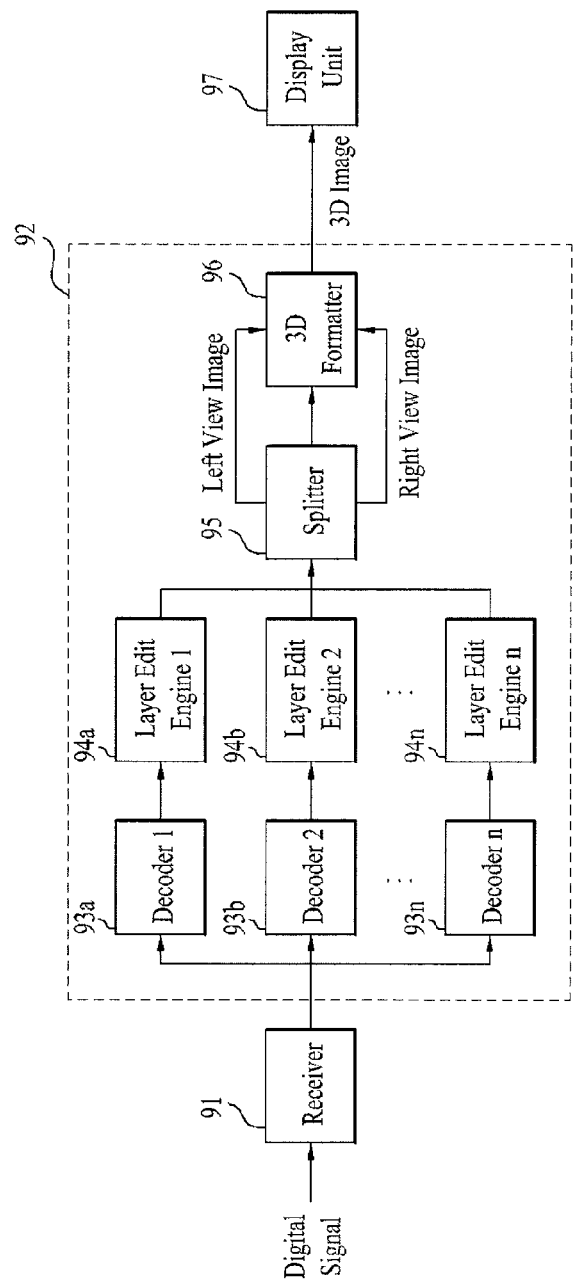

FIGS. 9A and 9B are block diagrams of an apparatus for processing a digital signal according to another embodiment of the present invention. In FIG. 9A, a digital signal may be received by a receiver 91. The digital signal may include a left view image and a right view image for a 3D image. The left view image and the right view image may respectively include a plurality of image layers (hereinafter, referred to as layers) having different depths. The receiver 91 may include a tuner of a television, a cable broadcasting receiver, or a network adaptor of a multimedia appliance.

The digital signal received by the receiver 91 is input to an image processor 92. The image processor 92 may include at least one of a decoder 93, a layer edit engine 94, a splitter 95, and a 3D formatter 96.

The decoder 93 of the image processor 92 may decode the input digital signal to output the plurality of layers having different depths. The layer edit engine 94 of the image processor 92 may edit each of the plurality of layers having different depths output from the decoder 93.

First, the layer edit engine 94 may set an edge region of an image in consideration of the depths of the input layers. The edge region may be set in consideration of at least one of positions, movement directions, and movement speeds of images constituted by the layers having a forward depth of the display unit. To this end, the method for setting the edge region in consideration of an image formed of the pixels having negative binocular disparity as described above with reference to FIG. 7 may be applied.

After the edge region has been set, the layer edit engine 94 may crop and output the set edge region with respect to some of the plurality of layers, i.e. the layers having a rearward depth of the display unit. The layer edit engine 94 may also directly output some of the plurality of layers having a forward depth of the display unit without performing the above mentioned cropping.

The above described edit procedure for the plurality of layers may be applied to the left view image and the right view image included in the digital signal. As a result, the layer edit engine 94 may edit and output the edge region only with respect to some of the plurality of layers, i.e. the layers having a rearward depth of the display unit.

The left view image and the right view image output from the layer edit engine 94 are input to the splitter 95 to thereby be divided into a left view image and a right view image for a 3D image. The left view image and the right view image may be input to the 3D formatter 96 to enable output of a 3D image.

The output 3D image may be input to a display unit for display of the 3D image. In the digital signal processing apparatus of the present invention, the display unit 97 may be an optional element and may be omitted according to an embodiment.

The display unit may display layers having a forward depth and layers having a rearward depth on a region except for the edge region, and may display only the layers having a forward depth on the edge region. As such, the edge region may display only the layers having a forward depth of the display unit.

Accordingly, in the digital signal processing apparatus, as described above, the edge region displays only the layers having a forward depth of the display unit, rather than displaying the layers having a rearward depth of the display unit. Thereby, the digital signal processing apparatus may provide the viewer with improved 3D effects by allowing the viewer to perceive the layers as if the layers having a forward depth come out of the layers having a rearward depth.

In FIG. 9B, a digital signal may be received by the receiver 91. The digital signal may include a left view image and a right view image for a 3D image. The left view image and the right view image may respectively include a plurality of image layers (hereinafter, referred to as layers) having different depths. The receiver 91 may include a tuner of a television, a cable broadcasting receiver, or a network adaptor of a multimedia appliance.

The digital signal received by the receiver 91 is input to the image processor 92. The image processor 92 may include at least one of a plurality of decoders 93a, 93b, . . . , 93n, a plurality of layer edit engines 94a, 94b, . . . , 94n, the splitter 95, and the 3D formatter 96.

The plurality of decoders 93a, 93b, . . . , 93n of the image processor 92 may receive and decode the respective layers having different depths. The number of the decoders 'n' may be equal to or greater than the number of layers included in the digital signal. The plurality of layers may be input respectively to the decoders so as to be individually decoded. The plurality of decoders 93a, 93b, . . . , 93n may decode and output the plurality of layers having different depths included in the digital signal.

The plurality of layer edit engines 94a, 94b, . . . , 94n of the image processor 92 may edit respectively the plurality of layers having different depths output from the plurality of decoders 93a, 93b, . . . , 93n. The number of the layer edit engines 'n' may be equal to or greater than the number of the layers included in the digital signal.

First, each layer edit engine may set an edge region of an image in consideration of the depths of the plurality of input layers. The edge region may be set in consideration of at least one of positions, movement directions, and movement speeds of images constituted by the layers having a forward depth of the display unit. To this end, the method for setting the edge region in consideration of an image formed of the pixels having negative binocular disparity as described above with reference to FIG. 7 may be applied.

After the edge region has been set, some of the plurality of layer edit engines, i.e. the layer edit engines having a rearward depth of the display unit may crop and output the set edge region with respect to the corresponding layers. That is, the layer edit engines may not output pixels included in the edge region among the layers having a rearward depth. The layer edit engines, which are adapted to edit the layers having a forward depth of the display unit may output the corresponding layers without performing the above mentioned cropping.

The above described edit procedure for the plurality of layers having a rearward depth of the display unit may be applied to the left view image and the right view image included in the digital signal. As a result, the layer edit engines 94a, 94b, . . . , 94n may edit and output the edge region only with respect to some of the plurality of layers included in the left view image and the right view image, i.e. the layers having a rearward depth of the display unit.

The left view image and the right view image output from the layer edit engines 94a, 94b, . . . , 94n are input to the splitter 95 to thereby be divided into a left view image and a right view image for a 3D image. The left view image and the right view image may be input to the 3D formatter 96 to enable output of a 3D image.

The output 3D image may be input to a display unit for display of the 3D image. In the digital signal processing apparatus of the present invention, the display unit 97 may be an optional element and may be omitted according to an embodiment.

The display unit may display layers having a forward depth and layers having a rearward depth on a region except for the edge region, and may display only the layers having a forward depth on the edge region. As such, the edge region may display only the layers having a forward depth of the display unit.

Accordingly, in the digital signal processing apparatus, as described above, the edge region displays only the layers having a forward depth of the display unit, rather than displaying the layers having a rearward depth of the display unit. Thereby, the digital signal processing apparatus may provide the viewer with improved 3D effects by allowing the viewer to perceive the layers as if the layers having a forward depth come out of the background layers having a rearward depth.

Figure 10:
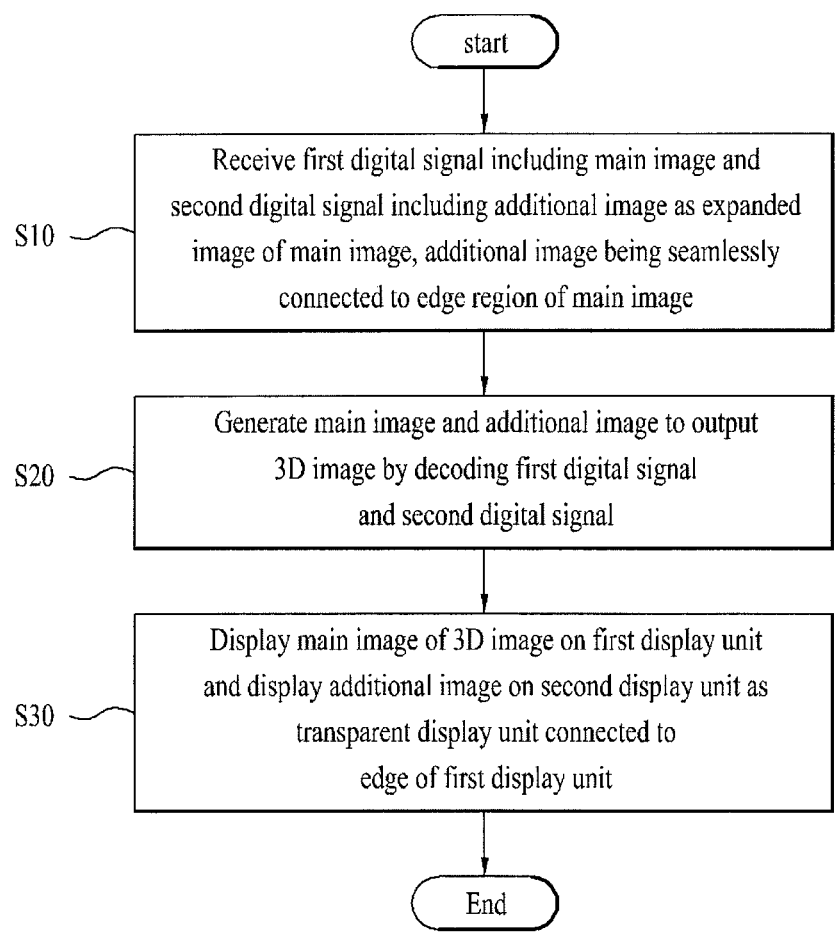
FIG. 10 is a flowchart showing a method for processing a digital signal according to an embodiment of the present invention.

FIG. 10 is a flowchart showing a method for processing a digital signal according to an embodiment of the present invention. The digital signal processing apparatus of the present invention may receive a first digital including a main image and a second digital signal including an additional image (S10). Here, the additional image is an image seamlessly connected to an edge region of the main image, and is an expanded image of the main image.

After the first digital signal and the second digital signal have been received, the digital signal processing apparatus may decode the first and second digital signals respectively to generate the main image and the additional image and output a 3D image (S20).

The received first and second digital signals may be input to an image processor. The first and second digital signals input to the image processor may be decoded by a first decoder and a second decoder respectively. The first digital signal is decoded to output the main image, and the second digital signal is decoded to output the additional image. Here, if the additional image includes both pixels having positive binocular disparity and pixels having negative binocular disparity, the second decoder may selectively output only the pixels having negative binocular disparity. If the additional image includes only the pixels having negative binocular disparity, the decoded result may be directly output without editing.

The main image and the additional image output respectively by the first decoder and the second decoder may be synchronized by a synchronizer. The additional image is an expanded image seamlessly connected to the main image, and therefore accurate synchronization of the additional image and the main image is necessary. Since the first digital signal and the second digital signal are received respectively by the first receiver and the second receiver and are decoded respectively by the different decoders, the main image and the additional image may have a temporal difference. For this reason, it may be necessary to synchronize the main image and the additional image in order to realize seamless connection of the two images.

The synchronized main and additional images may be input to a splitter and a 3D formatter in sequence, to enable output a 3D main image and a 3D additional image.

The digital signal processing apparatus may display the output 3D main image on a first display unit and the output 3D additional image on a second display unit (S30). The second display unit may include a transparent display, and as described above with reference to FIG. 2, may be connected to an edge of the first display unit, such that the 3D main image and the 3D additional image are displayed like a single 3D image to be viewed by the viewer.

The first display unit may display pixels of the 3D main image, i.e. pixels having positive binocular disparity and pixels having negative binocular disparity, and the second display unit may display only pixels of the 3D additional image having negative binocular disparity. As such, the pixels having a rearward depth of the display unit may be displayed only on the first display unit, and the pixels having a forward depth of the display unit may be displayed on the first and second display units. As a result, the digital signal processing apparatus may provide the effect of allowing the viewer to perceive the image formed of the pixels having a forward depth as if the image comes out of a limited region of the first display unit into an actual space.

Figure 11:
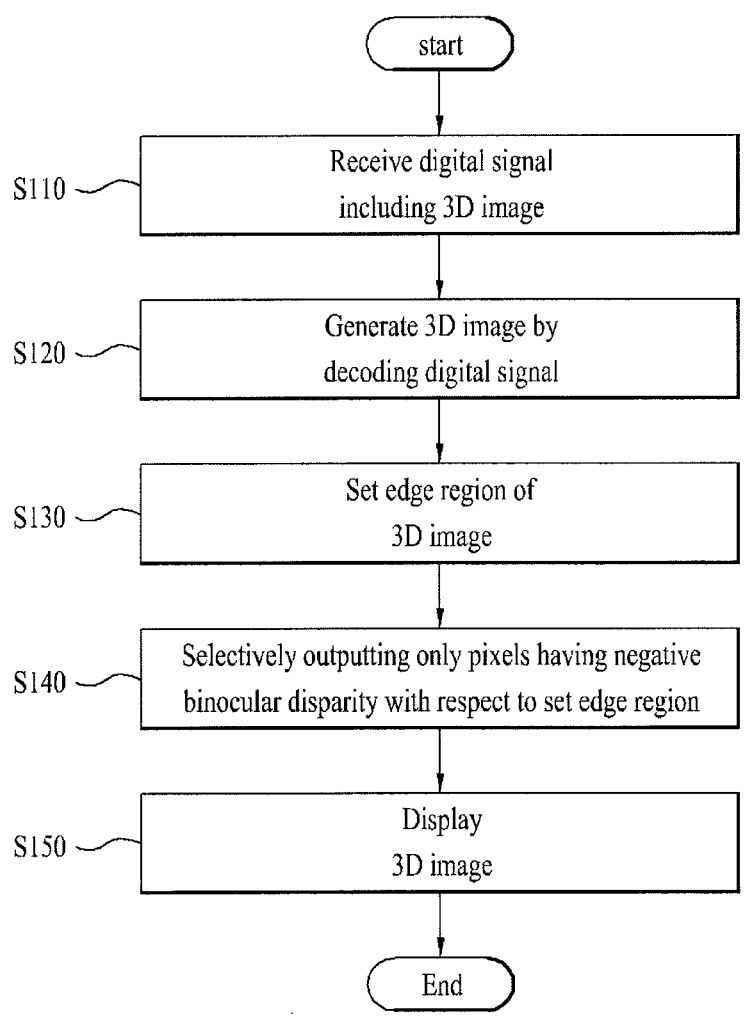
FIG. 11 is a flowchart showing a method for processing a digital signal according to a yet another embodiment of the present invention.

FIG. 11 is a flowchart showing a method for processing a digital signal according to a yet another embodiment of the present invention. The digital signal processing apparatus of the present invention may receive a digital including a 3D image (S110). Here, the digital signal may include a left view image and a right view image for a 3D image, or may include image data and depth information. The digital signal processing apparatus may receive the digital signal by means of a tuner of a television, a cable broadcasting receiver, or a network adaptor of a multimedia appliance.

The digital signal processing apparatus may generate a 3D image by decoding the digital signal (S120). The digital signal processing apparatus may output a left view image and a right view image included in the digital signal by decoding the digital signal. If the digital signal includes image data and depth information, the digital signal processing apparatus may generate and output the left view image and the right view image using the image data and the depth information. If the digital signal includes a plurality of layers having different depths, the digital signal processing apparatus may output a plurality of layers having different depths by decoding the corresponding digital signal.

The digital signal processing apparatus may set an edge region of a 3D image (S130).

The digital signal processing apparatus may determine signs of binocular disparity of the respective pixels forming the image by comparing the left view image and the right view image output from the decoder. Also, if the digital signal includes image data and depth information, the digital signal processing apparatus may determine the signs of binocular disparity of the respective pixels using the depth information. If the digital signal includes the plurality of layers having different depths, the digital signal processing apparatus may determine the signs of binocular disparity of the respective layers on the basis of a display unit. That is, the layers having a forward depth of the display unit have negative binocular disparity, and the layers having a rearward depth of the display unit have positive binocular disparity.

The digital signal processing apparatus may set the edge region of the image based on the determined signs of binocular disparity of the respective pixels or the respective layers. The edge region may be set in consideration of at least one of positions, movement directions, and movement speeds of images represented by the pixels or the layers having negative binocular disparity within the image as described above with reference to FIG. 7.

After the edge region has been set based on the signs of binocular disparity of the respective pixels, the digital signal processing apparatus may selectively output only the pixels having negative binocular disparity with respect to the edge regions of the left view image and the left view image (S140).

In the case in which the digital signal includes both a left view image and a right view image, or in the case in which the digital signal includes image data and depth information, the digital signal processing apparatus may not output the pixels having positive binocular disparity with respect to the edge regions of the left view image and the right view image output from the decoder, and may selectively output only the pixels having negative binocular disparity.

In the case in which the left view image and the right view image included in the digital signal have a plurality of layers having different depths, after the edge region has been set, the digital signal processing apparatus may crop and output the set edge region with respect to some of the plurality of layers, i.e. the layers having a rearward depth of the display unit. That is, pixels included in the edge region among the layers having a rearward depth are not output. The digital signal processing apparatus may output the layers having a forward depth of the display unit without performing the above mentioned cropping. This edit procedure for the plurality of layers may be applied to the left view image and the right view image included in the digital signal. As a result, the digital signal processing apparatus may edit and output the edge region only with respect to some of the plurality of layers included in the left view image and the right view image, i.e. the layers having a rearward depth of the display unit.

The digital signal processing apparatus may output all the pixels regardless of the signs of binocular disparity with respect to regions other than the edge regions of the left image and the right image. Then, the digital signal processing apparatus may output a 3D image from the output left and right view images by means of a splitter and a 3D formatter.

The digital signal processing apparatus may display the output 3D image (S150). In operation of the digital signal processing apparatus according to the present invention, the display step S150 may be an optional step and may be omitted according to an embodiment.

The digital signal processing apparatus may display pixels having positive binocular disparity and pixels having negative binocular disparity on a region except for the edge region, and may display only the pixels having negative binocular disparity on the edge region. As such, the edge region may display only the pixels having a forward depth of the display unit.

In this way, as described above, the digital signal processing apparatus may display only an image having negative binocular disparity, rather than displaying a background image having positive binocular disparity on the edge region. Thereby, the digital signal processing apparatus may provide the viewer with enhanced 3D effects by allowing the viewer to perceive the images as if the image having negative binocular disparity comes out of the background image having positive binocular disparity.

As is apparent from the above description, according to the present invention, it is possible to enhance stereoscopic viewing effects provided by a 3DTV.

Further, according to the present invention, it is possible to allow the viewer to perceive a 3D image as if the 3D image comes out of a virtual space displayed by a display unit of the 3DTV into an actual space.

According to the present invention, it is possible to enhance 3D effects by connecting a transparent display unit to a rim of an existing TV.

Furthermore, according to the present invention, editing a received general 3D image is possible, which can provide the effect of allowing the viewer to perceive the 3D image as if a dynamic image comes out of a background image.

In addition, according to the present invention, with respect to an image having a plurality of layers, it is possible to crop and edit only some of the layers in the rear of a screen.

Moreover, according to the present invention, it is possible to determine signs of binocular disparity on a per pixel basis by analyzing a left view image and a right view image constituting the 3D image.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A digital signal processing apparatus comprising:
a receiver configured to receive a digital signal including a first image source and a second image source; and
an image processor configured to:
generate a main stereoscopic image from the first image source and an additional image from the second image source, wherein the additional image is an expanded image of the main stereoscopic image, and the expanded image is partially corresponding to the main stereoscopic image,
display the main stereoscopic image on a first display unit, and
display the additional image on a second display unit,
wherein the second display unit is a transparent display unit connected to the first display unit,
wherein the main stereoscopic image includes a first part of a first graphical object and the additional image includes a second part of the first graphical object,
wherein the first part and the second part of the first graphical object are graphically connected, and
wherein the additional image included in the second image source includes only pixels providing a forward depth of the second display unit.

2. The digital signal processing apparatus according to claim 1,
wherein the image processor is further configured to determine signs of binocular disparity by comparing pixels of a left view image and a right view image of the generated additional image.

3. The digital signal processing apparatus according to claim 1,
wherein the image processor is further configured to selectively output a 3D image including only pixels having negative binocular disparity of the generated additional image, and
wherein the negative binocular disparity provides a forward depth of the second display unit.

4. The digital signal processing apparatus according to claim 1,
wherein the image processor is further configured to synchronize the main stereoscopic image and the additional image.

5. The digital signal processing apparatus according to claim 1,
wherein the second part of the first graphical object as displayed on the second display unit extends directly from the first part of the first graphical object displayed on the first display unit.

6. The digital signal processing apparatus according to claim 1,
wherein the first display unit is a television, or wherein the second display unit is a supplemental display unit of the first display unit.

7. The digital signal processing apparatus according to claim 1,
wherein the main stereoscopic image includes layers having different depths respectively, and
wherein the first display unit displays the entire layers included in the main stereoscopic image.

8. The digital signal processing apparatus according to claim 1,
wherein the additional image includes layers having different depths respectively, and
wherein the second display unit displays a part of layers included in the additional mage selectively.

9. The digital signal processing apparatus according to claim 1,
wherein the image processor is further configured to display a second graphical object, and
wherein a first part of the second graphical object corresponding to the main stereoscopic image is displayed on the first display unit, and a second part of the second graphical object corresponding to the additional image is not displayed on the second display unit.

10. The digital signal processing apparatus according to claim 9,
wherein first binocular disparity of the first graphical object is smaller than second binocular disparity of the second graphical object.

11. A digital signal processing method comprising:
receiving a digital signal including a first image source and a second image source;
generating a main stereoscopic image from the first image source and an additional image from a second image source, wherein the additional image is an expanded image from the main stereoscopic image, and the expanded image is partially corresponding to the main stereoscopic image;
displaying the main stereoscopic image on a first display unit; and
displaying the additional image on a second display unit,
wherein the second display unit is a transparent display unit connected to the first display unit,
wherein the main stereoscopic image includes a first part of a first graphical object and the additional image includes a second part of the first graphical object,
wherein the first part of the second part of the first graphical object are graphically connected, and
wherein the additional image included in the second image source includes only pixels providing a forward depth of the second display unit.

12. The digital signal processing method according to claim 11, further comprising:
determining signs of binocular disparity by comparing pixels of a left view image and a right view image of the generated additional image.

13. The digital signal processing method according to claim 11, further comprising:
selectively outputting a 3D image including only pixels having negative binocular disparity of the generated additional image,
wherein the negative binocular disparity provides a forward depth of the second display unit.

14. The digital signal processing method according to claim 11, further comprising:
synchronizing the main stereoscopic image and the additional image.

15. The digital signal processing method according to claim 11,
wherein the second display unit is a supplemental display unit of the first display unit.

16. The digital signal processing method according to claim 11,
wherein the main stereoscopic image includes layers having different depths respectively, and
wherein the first display unit displays the entire layers included in the main stereoscopic image.

17. The digital signal processing method according to claim 11,
wherein the additional image includes layers having different depths respectively, and
wherein the second display unit displays a part of layers included in the additional mage selectively.

18. A digital signal processing apparatus comprising:
a receiver configured to receive a digital signal including a first image source and a second image source; and
an image processor configured to:
generate a main stereoscopic image from the first image source and an additional image from the second image source, wherein the additional image is an expanded image of the main stereoscopic image, and the additional image is seamlessly connected to an edge region of the main stereoscopic image,
display entire pixels of the main stereoscopic image on a first display unit, and
display a part of pixels of the additional image on a second display unit,
wherein the second display unit is a transparent display unit connected to the first display unit,
wherein the main stereoscopic image includes a first part of a first graphical object and the additional image includes a second part of the first graphical object,
wherein the first part and the second part of the first graphical object are graphically connected, and
wherein the additional image included in the second image source includes only pixels providing a forward depth of the second display unit.

19. A digital signal processing method comprising:
receiving a digital signal including a first image source and a second image source;
generating a main stereoscopic image form the first image source and an additional image form the second image source, wherein the additional image is an expanded image of the main stereoscopic image, and the additional image is seamlessly connected to an edge region of the main stereoscopic image;
displaying entire pixels of the main stereoscopic image on a first display unit; and
selectively displaying a part of pixels of the additional image on a second display unit,
wherein the second display unit is a transparent display unit connected to the first display unit,
wherein the main stereoscopic image includes a first part of a first graphical object and the additional image includes a second part of the first graphical object,
wherein the first part and the second part of the first graphical object are graphically connected, and
wherein the additional image included in the second image source includes only pixels providing a forward depth of the second display unit.

* * * * *